US010419769B2

(12) United States Patent
Suzuki

(10) Patent No.: US 10,419,769 B2
(45) Date of Patent: Sep. 17, 2019

(54) IMAGE PROCESSING APPARATUS, IMAGE PROCESSING METHOD, AND NON-TRANSITORY COMPUTER READABLE STORAGE MEDIUM

(71) Applicant: CANON KABUSHIKI KAISHA, Tokyo (JP)

(72) Inventor: Ryota Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 15/333,461

(22) Filed: Oct. 25, 2016

(65) Prior Publication Data

US 2017/0127070 A1    May 4, 2017

(30) Foreign Application Priority Data

Oct. 30, 2015 (JP) ................. 2015-214800

(51) Int. Cl.
*H04N 19/31*  (2014.01)
*H04N 21/41*  (2011.01)
*H04N 19/146* (2014.01)
*H04N 19/187* (2014.01)
*H04N 21/4402* (2011.01)

(52) U.S. Cl.
CPC ........... *H04N 19/31* (2014.11); *H04N 19/146* (2014.11); *H04N 19/187* (2014.11); *H04N 21/4126* (2013.01); *H04N 21/440263* (2013.01); *H04N 21/440281* (2013.01)

(58) Field of Classification Search
None
See application file for complete search history.

(56) References Cited

U.S. PATENT DOCUMENTS

| 5,852,565 | A  | * | 12/1998 | Demos | H04N 5/4401 |
|           |    |   |         |       | 708/203 |
| 6,233,356 | B1 | * | 5/2001  | Haskell | H04N 5/4401 |
|           |    |   |         |         | 348/408.1 |
| 8,379,677 | B2 |   | 2/2013  | Leung et al. | |
| 9,648,336 | B2 |   | 5/2017  | Suzuki | |
| 2003/0142744 | A1 | * | 7/2003 | Wu | G06T 9/00 |
|              |    |   |        |    | 375/240.03 |
| 2006/0193379 | A1 | * | 8/2006 | Ridge | H04N 19/176 |
|              |    |   |        |       | 375/240.01 |
| 2014/0328383 | A1 |   | 11/2014 | Suzuki | |

FOREIGN PATENT DOCUMENTS

| JP | 2008-278492 A | 11/2008 |
| JP | 2014-220599 A | 11/2014 |
| JP | 2015-080035 A | 4/2015 |

* cited by examiner

*Primary Examiner* — Xiaolan Xu
(74) *Attorney, Agent, or Firm* — Venable LLP

(57) ABSTRACT

An image processing apparatus which compares a first frame rate of a first moving image and a second frame rate of a second moving image each moving image having temporal scalability, converts a temporal hierarchical structure of the second moving image, when the first frame rate is higher than the second frame rate, by copying and inserting a picture included in a first temporal layer of the second moving image into a second temporal layer of the second moving image, and when the first frame rate is lower than the second frame rate, by discarding a picture, of pictures belonging to temporal layers of the second moving image, which belongs to a temporal layer with a frame rate higher than the first frame rate, and combines the first moving image with the converted second moving image.

9 Claims, 8 Drawing Sheets

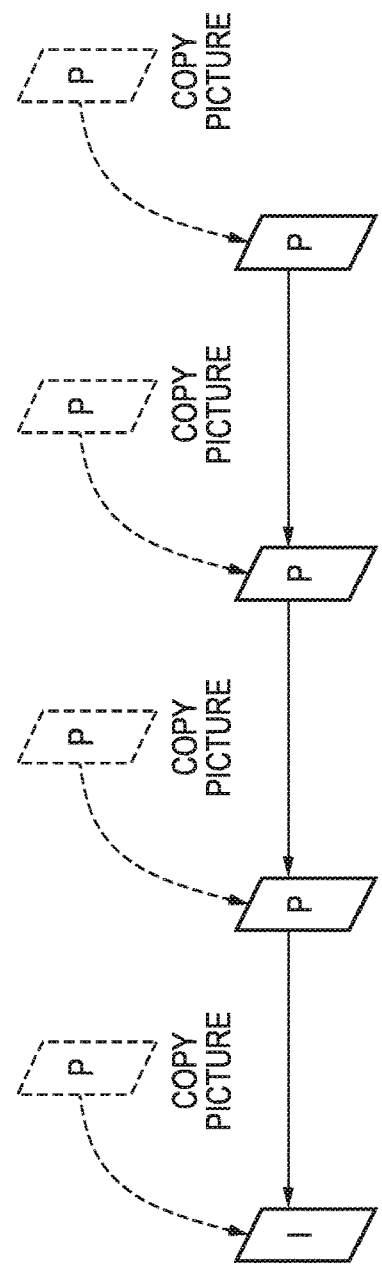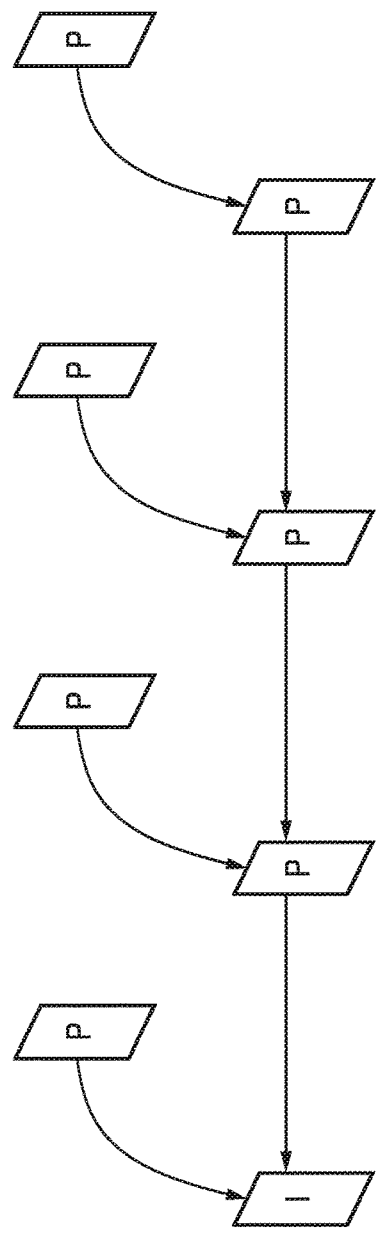

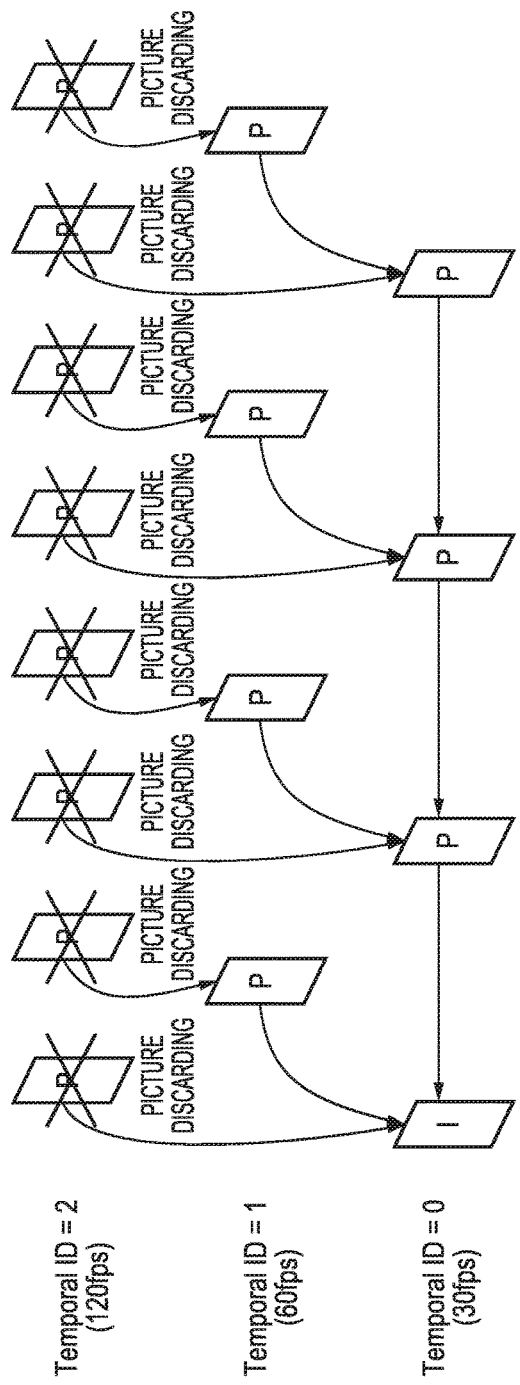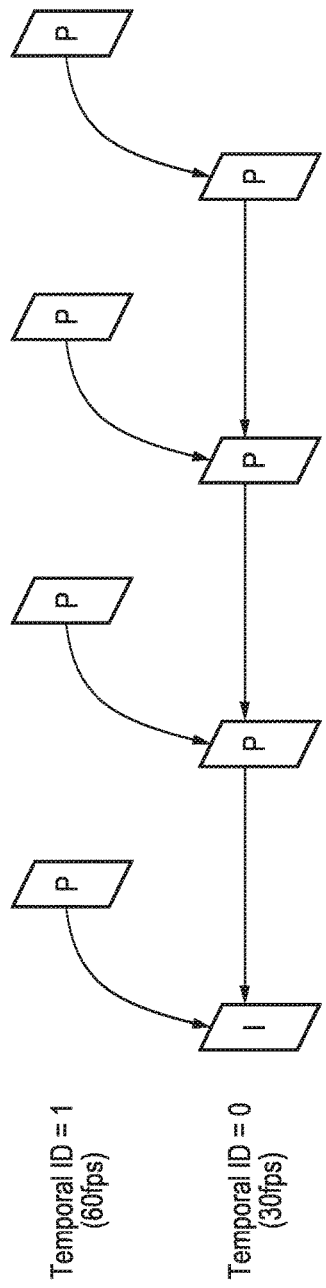
FIG. 4A
FIG. 4B

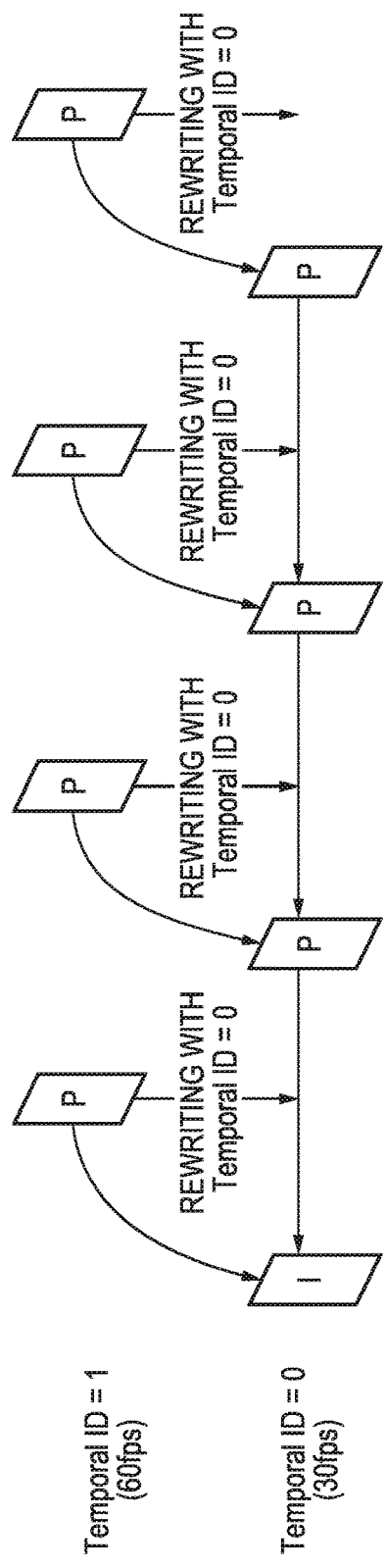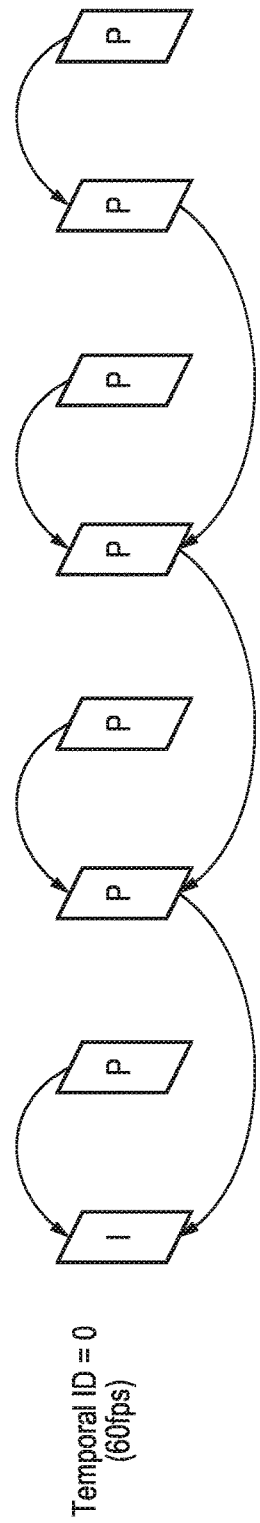

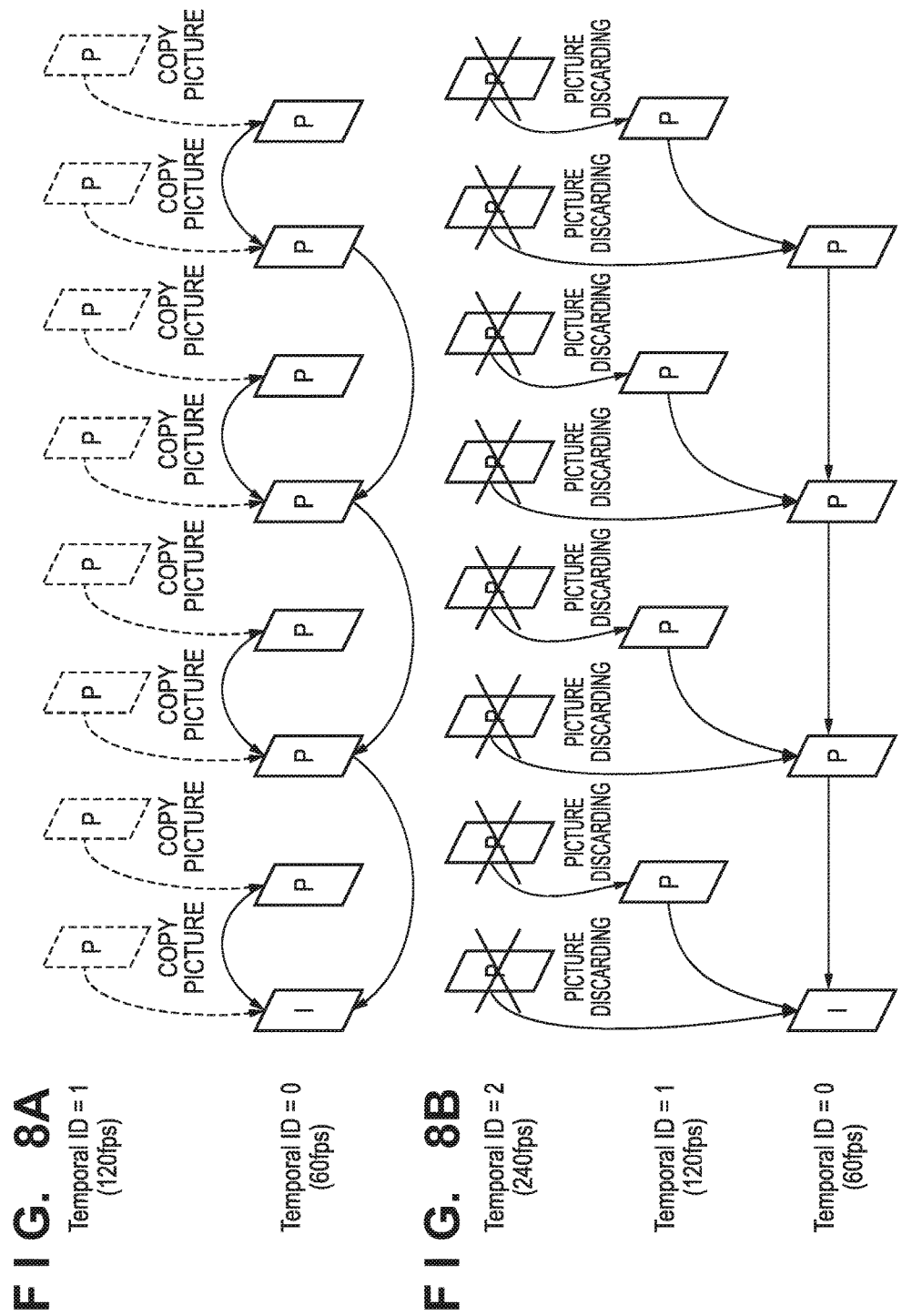

IMAGE PROCESSING APPARATUS, IMAGE PROCESSING METHOD, AND NON-TRANSITORY COMPUTER READABLE STORAGE MEDIUM

BACKGROUND OF THE INVENTION

Field of the Invention

The present invention relates to an image processing apparatus, an image processing method, and a non-transitory computer readable storage medium.

Description of the Related Art

With the recent proliferation of digital video cameras and digital cameras with a moving image shooting function, there are increasing opportunities to handle moving image data. Along with this trend, various types of moving image editing applications are provided. One of such moving image editing operations is to combine a plurality of moving images into one moving image. For example, Japanese Patent Laid-Open No. 2008-278492 discloses a method of, when combining/editing a plurality of moving images having different frame rates, changing one of the frame rates to ensure compatibility between the frame rates.

According to the method disclosed in Japanese Patent Laid-Open No. 2008-278492, when moving images having different frame rates are combined, encoded data as a conversion source is temporarily decoded and then reencoded in accordance with the frame rate of the conversion destination. When the processing of decoding whole target encoded data and reencoding the data is performed for each editing operation, the processing time will be very long. This makes it difficult to improve the efficiency of processing.

SUMMARY OF THE INVENTION

The present invention enables efficient processing when combining/editing moving images having different frame rates.

One aspect of embodiments of inventions relates to an image processing apparatus comprising a processor and a memory storing a program which, when executed by the processor, causes the image processing apparatus to compare a frame rate of a first moving image and a frame rate of a second moving image, wherein each moving image has temporal scalability, convert a temporal hierarchical structure of the second moving image in accordance with the comparison result, wherein when the frame rate of the first moving image is higher than the frame rate of the second moving image, the temporal hierarchical structure of the second moving image is converted by copying and inserting a picture included in a first temporal layer of the second moving image into a second temporal layer of the second moving image, and when the frame rate of the first moving image is lower than the frame rate of the second moving image, the temporal hierarchical structure of the second moving image is converted by discarding a picture, of pictures belonging to temporal layers of the second moving image, which belongs to a temporal layer with a frame rate higher than the frame rate of the first moving image, and combine the first moving image with the converted second moving image.

Further features of the present invention will become apparent from the following description of exemplary embodiments (with reference to the attached drawings).

BRIEF DESCRIPTION OF THE DRAWINGS

FIGS. 3A and 3B are views for explaining an example of the processing of changing the frame rate of an editing target moving image according to the first embodiment of the present invention;

FIGS. 4A and 4B are views for explaining another example of the processing of changing the frame rate of an editing target moving image according to the first embodiment of the present invention;

FIGS. 6A and 6B are views for explaining an example of processing for matching the lowest layer of an editing target moving image with a reference moving image according to the second embodiment of the present invention;

FIGS. 8A and 8B are views for explaining another example of the processing of changing the frame rate of an editing target moving image according to the second embodiment of the present invention.

DESCRIPTION OF THE EMBODIMENTS

The embodiments of the present invention will be described in detail below.

First Embodiment

Figure 1:
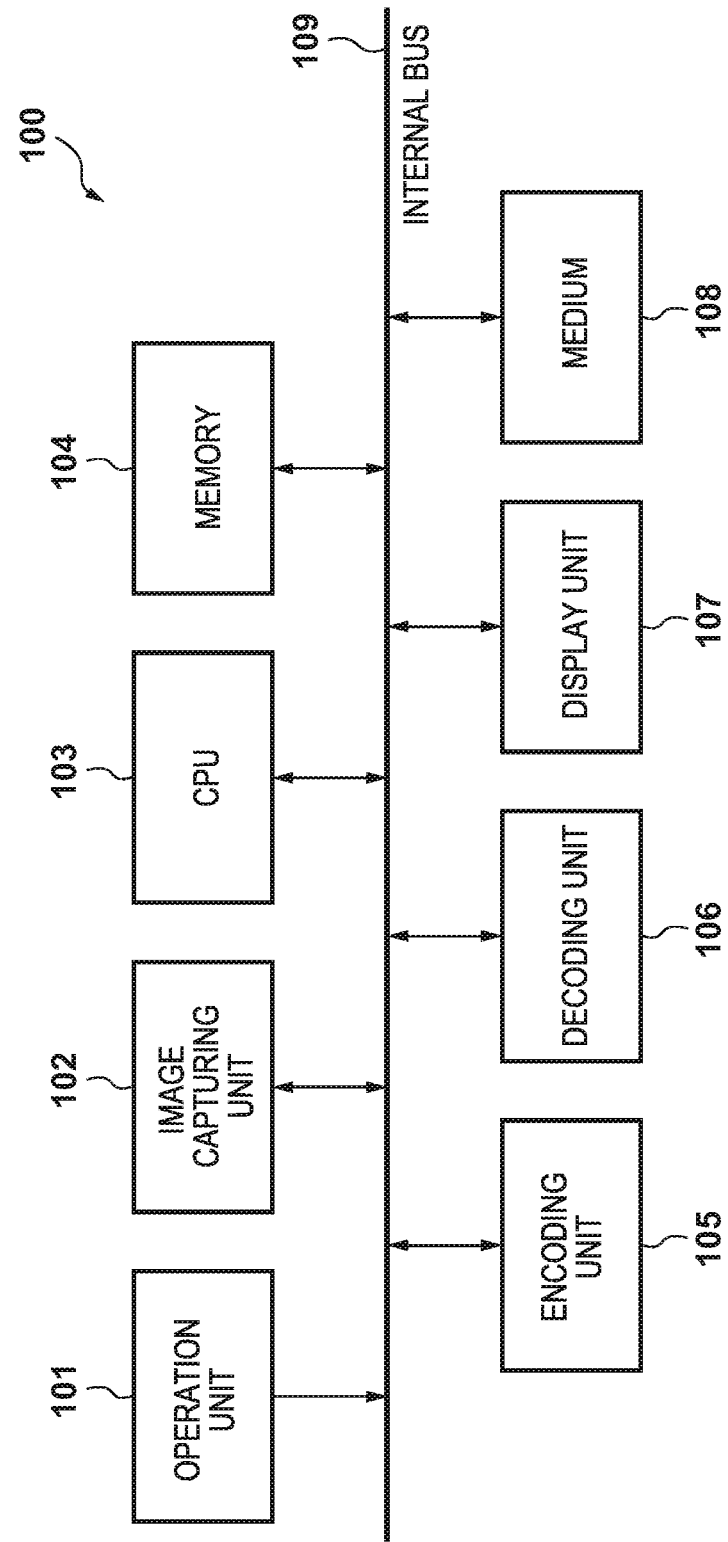
FIG. 1 is a block diagram showing an example of the arrangement of a moving image encoding apparatus according to an embodiment of the present invention.

FIG. 1 shows an example of the arrangement of a moving image encoding apparatus according to the first embodiment of the present invention. The moving image encoding apparatus shown in FIG. 1 can record an input video signal upon performing encoding processing of the signal, and combine/edit a plurality of recorded encoded data. This moving image encoding apparatus can be implemented as, for example, a digital camera or digital video camera. In addition, the moving image encoding apparatus can be implemented as, for example, an arbitrary information processing terminal or image capturing apparatus such as a personal computer, cellular phone, smartphone, PDA, or tablet terminal. Note that FIG. 1 shows an arrangement including an image capturing unit 102 in consideration of a case in which this apparatus functions as a digital camera or the like. According to an embodiment of the present invention, an image editing apparatus or image processing apparatus which combines/edits moving images having different frame rates or temporal hierarchical structures may be implemented by an arrangement without the image capturing unit 102.

Combining/editing processing of a plurality of moving images encoded by a moving image encoding apparatus 100 according to this embodiment based on the H.265 standard will be described with reference to FIG. 1. Although this embodiment will exemplify an encoding scheme based on the H.265 standard, the embodiment can also be applied to another temporal scalable encoding scheme such as the H.264 encoding scheme.

An operation unit 101 shown in FIG. 1 receives a command from the user, generates a control signal corresponding to the command, and supplies the signal to a CPU 103. For example, the operation unit 101 includes buttons and a touch panel as input devices which receive user commands. The image capturing unit 102 includes an image sensor such as a CMOS image sensor and an A/D converter. The image sensor outputs an analog image signal by photoelectrically converting an optical image obtained by capturing an image of an object in accordance with a record instruction from the operation unit 101. The A/D converter generates image data by A/D-converting the image signal. The image data is output to a memory 104 to be stored in it. The CPU 103 controls each processing unit of the moving image encoding apparatus 100 according to this embodiment based on a control signal input from the operation unit 101. The memory 104 temporarily stores image data output from the image capturing unit 102, moving image data after processing by an encoding unit 105 or a decoding unit 106, and the like. The memory 104 also functions as a work memory of the CPU 103, and stores programs and data for the execution of various types of processing (to be described later).

The encoding unit 105 encodes image data stored in the memory 104 in accordance with the temporal scalable encoding scheme. The encoding unit 105 performs intra-frame or inter-frame predictive encoding, orthogonal transformation, and quantization of image data for each predetermined pixel block and entropy-encodes the quantized data, thereby generating encoded data. In this case, this embodiment is configured to generate encoded data by temporal scalable encoding as one approach to generate encoded data with high editability. In temporal scalable encoding, it is possible to generate moving images having a plurality of frame rates from one encoded data by letting a frame rate have scalability based on a temporal hierarchical structure in advance.

For example, encoded data having a frame rate of 120 fps can have layers respectively corresponding to frame rates of 30 fps, 60 fps, and 120 fps as temporal layers (or layers) to which pictures constituting the encoded data belong. The positional relationship between the respective layers of this hierarchical structure is determined such that a frame rate corresponding to the higher layer of adjacent layers is set to double of a frame rate corresponding to the lower layer. More specifically, of 120 pictures corresponding to one second of a moving image having, for example, a frame rate of 120 fps, 30 pictures belong to the first layer associated with a frame rate of 30 fps which is the lowest layer. In addition, 30 pictures belong to the second layer associated with a frame rate of 60 fps which is a layer immediately higher than the first layer. The sum of pictures belonging to the first and second layers is 60. That is a frame rate of 60 fps can be achieved. In addition, the remaining 60 pictures belong to the third layer which is the highest layer immediately higher than the second layer and associated with a frame rate of 120 fps. The sum of pictures belonging to the first to third layers is 120, thus achieving a frame rate of 120 fps.

When performing temporal scalable encoding, the encoding unit 105 performs encoding such that the image reference structure of the respective pictures becomes hierarchical, and adds temporal layer information to each picture upon limiting the image reference relationship between the pictures so as to always inhibit each picture from referring to an image on a temporal layer higher than the layer to which the picture belongs. In the above case, therefore, pictures belonging to the second layer can refer to only pictures belonging to the first layer. In addition, pictures belonging to the third layer of 120 fps can refer to only pictures belonging to the first or second layer. The encoding unit 105 writes the generated encoded data in the memory 104.

The decoding unit 106 reads encoded data recorded on a medium 108 and entropy-decodes the data. The decoding unit 106 then performs inverse quantization and inverse orthogonal transformation of the decoded data and writes the data in the memory 104. The decoded image data can be supplied to a display unit 107 and displayed based on an instruction from the CPU 103. The display unit 107 is a display which displays the progress of editing and image data decoded by the decoding unit 106. The medium 108 is a recording medium formed from a hard disk drive, non-volatile memory, or the like, on which encoded data is recorded. An internal bus 109 is an inter connect bus which connects the respective processing units constituting the moving image encoding apparatus 100 according to this embodiment.

The moving image encoding apparatus 100 according to this embodiment has the above arrangement. The moving image encoding apparatus 100 according to the embodiment can edit a plurality of moving images to combine them, and operates as follows.

First of all, when the user inputs an editing start instruction via the operation unit 101, the display unit 107 displays a screen showing a list of moving images as editing target candidates. The user can select moving images as editing targets from the displayed candidates by operating the operation unit 101. When the user selects editing target moving images, the CPU 103 acquires frame rate information and temporal layer information of the moving images as the editing targets designated by the user from the moving images recorded on the medium 108. In this case, the user further selects, via the operation unit 101, a moving image (to be also referred to as a "reference moving image" hereinafter) as a frame rate compatibility reference from the moving images selected as editing targets. A moving image as a frame rate compatibility reference is a moving image as a reference for frame rate conversion to be performed when editing target moving images have different frame rates. Thereafter, the CPU 103 writes the data of the editing target moving images in the memory 104, and starts combining/editing processing. When the combining/editing processing ends, the CPU 103 writes the combined/edited moving image data in the memory 104 and records the data on the medium 108.

Note that in combining/editing processing, when editing target moving images have different frame rates and different temporal layer structures, it is necessary to ensure compatibility between the frame rates of the editing target moving images. This embodiment therefore performs frame rate conversion by converting the temporal layer structures of editing target moving images except for the moving image as the frame rate compatibility reference, and then executes combining/editing processing.

Figure 2:
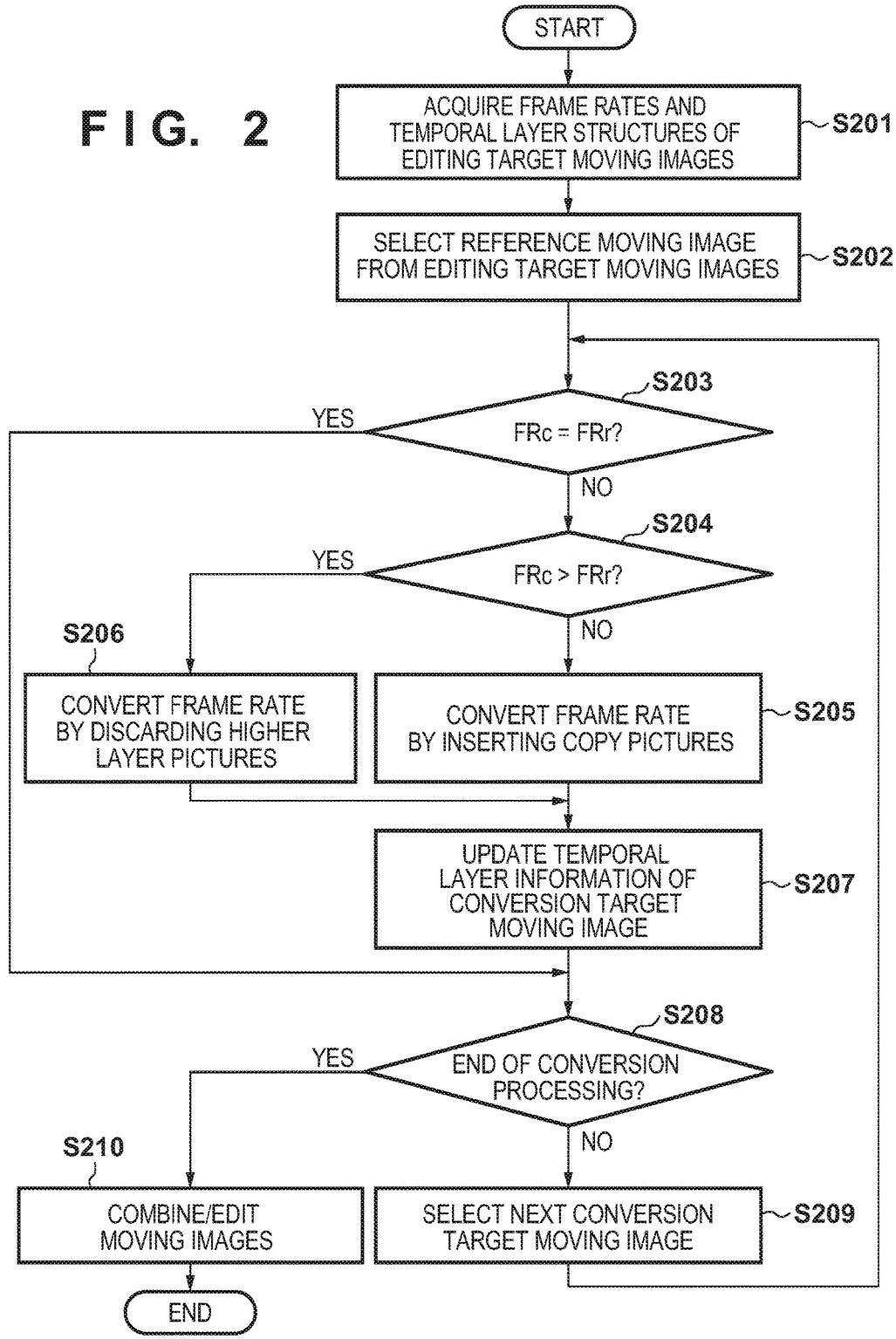
FIG. 2 is a flowchart showing an example of processing according to the first embodiment of the present invention.

The details of combining/editing processing corresponding to this embodiment will be described below with reference to the flowchart shown in FIG. 2. A method of converting temporal layer structures when moving images have different frame rates in combining/editing of a plurality of moving images performed by the CPU 103 will be particularly described in detail below. Processing corresponding to the flowchart of FIG. 2 can be implemented by, for example, a program (stored in the memory 104) corresponding to the CPU 103 functioning as a combining/editing processing unit.

First of all, in step S201, the CPU 103 acquires the information of the frame rate and temporal layer structure of each moving image selected by the user as an editing target from the medium 108 storing the moving images. When a frame rate (fps) is embedded as moving image information in a file format, it is possible to acquire the frame rate by referring to the file format. In addition, the CPU 103 can acquire a frame rate by calculating it from num_units_in_tick and time_scale included in HRD parameters syntax of the header portion of encoded data. A method of acquiring temporal layer information may be a method of discriminating temporal layer information from nuh_temporal_ID_plus1 included in nal_unit_header Syntax of the header portion of the encoded data, a method of acquiring temporal layer information from vps_MAX_sub_layers_minus1 included in VPS (Video Parameter Set) Syntax of the header portion, or a method of acquiring temporal layer information from sps_MAX_sub_layers_minus1 included in SPS (Sequence Parameter Set) Syntax of the header portion. The following is the relationship between the frame rates and temporal layer structures of moving images as editing targets. Note that Temporal ID is a specifier indicating a temporal layer number.

i) frame rate: 30 fps
Temporal ID0=30 fps
ii) frame rate: 60 fps
Temporal ID0=30 fps
Temporal ID1=60 fps
iii) frame rate: 120 fps
Temporal ID0=30 fps
Temporal ID1=60 fps
Temporal ID2=120 fps In step S202, the user selects a reference moving image as a reference used when ensuring compatibility between frame rates from moving images selected as editing targets in step S201. Assume that in the following case, the moving image with 60 fps has been selected as a reference moving image from the above three moving images. Note that when selecting a moving image as a frame rate compatibility reference (to be also simply referred to as a "reference" hereinafter), for example, a moving image having the highest or lowest frame rate among editing target moving images may be automatically selected as a reference in addition to the user instruction via the operation unit 101. Alternatively, this method may be executed only when selected editing target images have different frame rates. Note that since a selection method itself is not an essential feature of the present invention, a method other than the above methods may be used.

In step S203, the CPU 103 determines whether the frame rate (to be referred to as "FRc" hereinafter) of a moving image as a frame rate conversion target (to be referred to as a "conversion target moving image" hereinafter) is equal to the frame rate (to be referred to "FRr" hereinafter) of a reference moving image. If FRc is equal to FRr, the process advances to step S208. If they differ from each other, the process advances to step S204.

In step S204, the CPU 103 compares FRc with FRr. If FRc is lower than FRr, the process advances to step S205. If FRc is higher than FRr, the process advances to step S206. In this case, the frame rate of a reference moving image is set to 60 fps. Therefore, the process advances to step S205 to process a moving image with 30 fps, and advances to step S206 to process a moving image with 120 fps.

In step S205, the CPU 103 performs frame rate conversion processing and temporal layer structure conversion processing when the frame rate FRc of the conversion target moving image is lower than the frame rate FRr of the reference moving image. More specifically, the CPU 103 generates and inserts picture data (to be referred to as "copy picture data" hereinafter) to repeatedly display a picture immediately before each picture from the leading picture when performing the processing of increasing the frame rate by frame interpolation. That is, performing editing to display a picture twice with the same contents will up-convert a moving image with 30 fps into a moving image with 60 fps. Note that copy picture data is interpolation data for interpolating for a frame rate deficiency and encoded data having a P-picture format or B-picture format as a data arrangement in which an immediately preceding picture is referred to and held without any change. In such copy picture data, Temporal ID as a temporal layer specifier is handled as a higher temporal layer of Temporal ID+1 of a copy picture reference source. In this case, processing in step S205 is the processing of converting a moving image with 30 fps into a moving image with 60 fps. The temporal layer structure obtained by the conversion processing in step S205 will be described with reference to FIGS. 3A and 3B.

FIG. 3A shows an example of increasing the frame rate to 60 fps by inserting copy picture data into a conversion target moving image having 30 fps. In this case, a copy picture of each picture constituting a frame rate of 30 fps is generated as a P-picture, and each picture as a generation source is referred to. Note that FIG. 3A shows a case in which the moving image is generated by only P-pictures, for the sake of simplicity. However, a moving image may be generated as a B-picture image. Temporal ID of each copy picture is 1 as a value indicating a layer immediately higher than a layer indicated by 0 which is Temporal ID of the source picture. FIG. 3B shows an example of a reference moving image when performing conversion processing like that shown in FIG. 3A. FIG. 3B shows a moving image with 60 fps.

In step S206, the CPU 103 performs frame rate conversion and temporal layer structure conversion processing when the frame rate FRc of the conversion target moving image is higher than the frame rate FRr of the reference moving image. More specifically, when performing the processing of reducing a frame rate by picture discarding, the CPU 103 discards pictures belonging to a temporal layer of a frame rate higher than that of a reference moving image for each picture from the leading picture. In this case, the CPU 103 performs the processing of converting a moving image with 120 fps into a moving image with 60 fps. The temporal layer structure obtained by conversion processing in step S206 will be described with reference to FIGS. 4A and 4B.

FIG. 4A shows an example of reducing the frame rate to 60 fps by discarding pictures with respect to a conversion target moving image with 120 fps. In this case, since the frame rate of the reference moving image is 60 fps, pictures belonging to the temporal layer with 120 fps (Temporal ID=2) are discarded. FIG. 4B shows an example of a reference moving image when performing conversion processing like that shown in FIG. 4A. FIG. 4B shows a moving image with 60 fps.

In step S207, the CPU 103 updates frame rate information and temporal layer information which have been changed by reconstructing the temporal layer structure of the frame rate conversion target moving image in step S205 or S206. With regard to frame rates, information such as num_units_in_tick and time_scale included in HRD parameters syntax of the header portion of encoded data is updated. In addition, with regard to temporal layer information, information such as nuh_temporal_ID_plus1 included in nal_unit_header Syntax, vps_MAX_sub_layers_minus1 included in VPS (Video Parameter Set) Syntax, and sps_MAX_sub_layers_minus1 included in SPS (Sequence Parameter Set) Syntax of the header portion of the encoded data is updated.

Subsequently, in step S208, the CPU 103 determines whether all frame rate conversion of the conversion target moving image is completed. If the processing is completed with respect to all the conversion target moving images, the process advances to step S210. Otherwise, the process advances to step S209. In this case, conversion target moving images indicate all editing target moving images other than a reference moving image. In this case, since there are two editing target moving images other than a reference moving image, the processing in steps S203 to S207 is executed twice. In step S209, the CPU 103 selects an unprocessed conversion target moving image and returns to step S203 to repeat the processing. If there is no unprocessed conversion target moving image and conversion processing for all the conversion target moving images is completed, the CPU 103 generates one moving image file by combining editing target moving images in step S210. The CPU 103 then records, in the file format, frame rate information which has been changed by reconstructing the temporal layer structure.

As described above, when a plurality of moving images encoded temporally scalably have different frame rates, the moving image encoding apparatus 100 ensures compatibility between the frame rates by performing temporal layer structure conversion by increasing or decreasing the number of pictures included in the moving images without decoding any moving images. First of all, the CPU 103 acquires the frame rates and temporal layer structures of editing target moving images saved in the medium 108, and selects a reference moving image for ensuring frame rate compatibility from the editing target moving images. The CPU 103 can generate moving images having frame rate compatibility by reconstructing the temporal layer structures so as to make the editing target moving images have the same temporal layer structure as that of the moving image as the frame rate compatibility reference. In addition, since frame rate conversion processing is performed without changing the image reference relationship between pictures, it is possible to perform combining/editing without requiring reencoding processing.

Second Embodiment

The second embodiment of the present invention will be described next. Since the arrangement of a moving image encoding apparatus according to this embodiment is the same as that of the moving image encoding apparatus in FIG. 1, a description of the arrangement will be omitted. The first embodiment has exemplified the case in which frame rates corresponding to the lowest temporal layers of editing target moving images are equal to each other. In contrast, the second embodiment will exemplify a temporal layer structure conversion method when the frame rates indicated by the lowest temporal layers of editing target moving images differ from each other. In this embodiment, when the frame rate indicated by the lowest temporal layer of a moving image as a frame rate conversion target is higher than that indicated by the lowest temporal layer of a moving image as a frame rate compatibility reference, the temporal layer structure is converted by reencoding. In contrast to this, when the frame rate indicated by the lowest temporal layer of a moving image as a frame rate conversion target is lower than that indicated by the lowest temporal layer of a moving image as a frame rate compatibility reference, temporal layer structure conversion processing is performed by only rewriting Temporal ID and header information.

Figure 5:
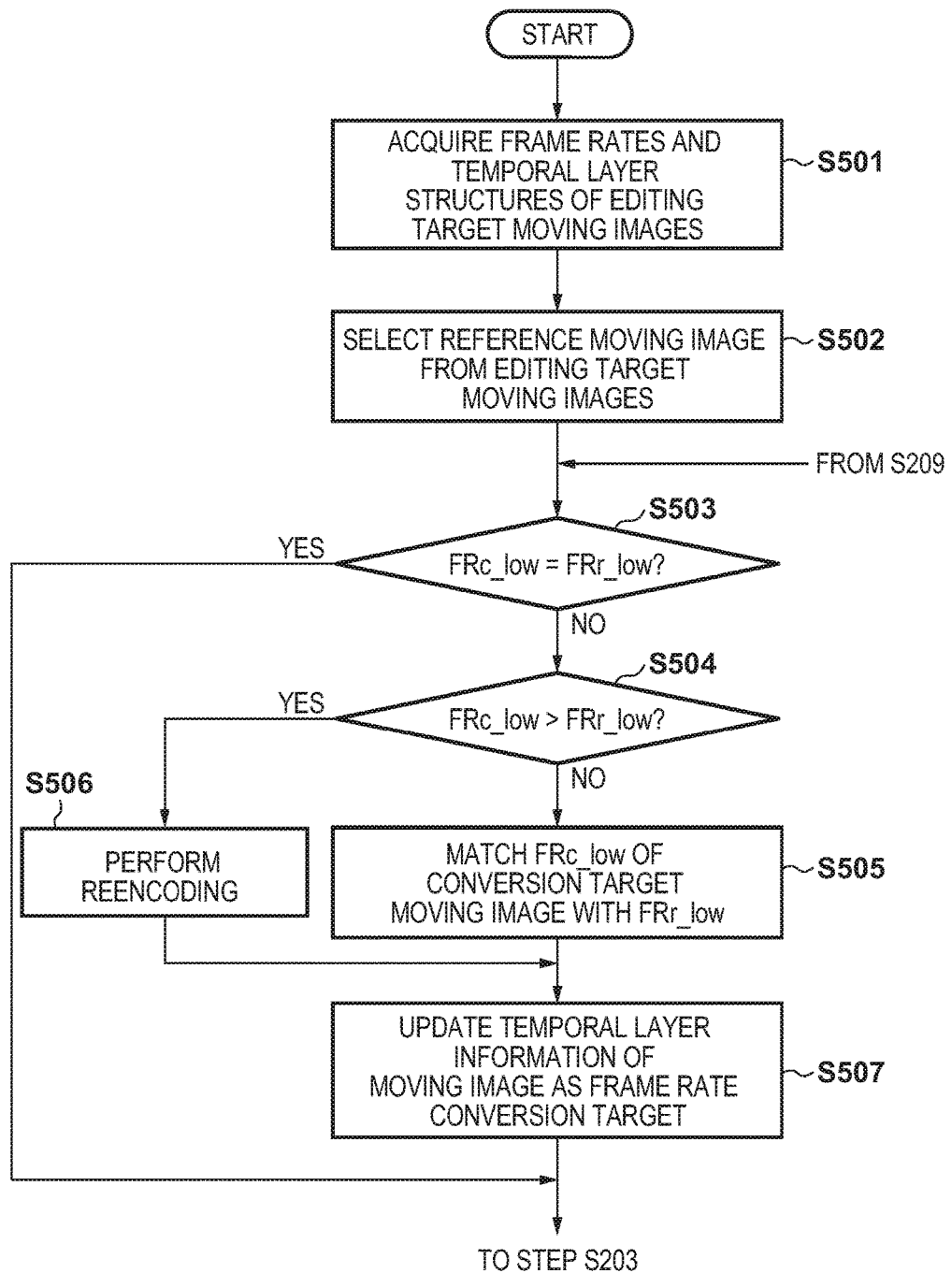
FIG. 5 is a flowchart showing an example of processing according to the second embodiment of the present invention.

The details of conversion processing according to this embodiment will be described below with reference to the flowchart shown in FIG. 5. A CPU 103 functioning as a combining/editing processing unit can implement the processing corresponding to the flowchart of FIG. 5 by executing a corresponding program (stored in a memory 104). Note that this embodiment includes the processing of integrating the frame rates of the lowest temporal layers while including the processing according to the first embodiment. For this reason, the processing unique to the embodiment will be mainly described in detail, and a description of the same processing as that in the first embodiment will be omitted.

First of all, in step S501, moving images as editing targets are selected, and the frame rates and temporal layer structures of the respective moving images are acquired. This processing corresponds to step S201 in the first embodiment. The following is the relationship between the frame rates and temporal layer structures of moving images as editing targets.
 i) frame rate: 60 fps
 Temporal ID0=30 fps
 Temporal ID1=60 fps
 ii) frame rate: 120 fps
 Temporal ID0=60 fps
 Temporal ID1=120 fps
 iii) frame rate: 240 fps
 Temporal ID0=120 fps
 Temporal ID1=240 fps In step S502, a reference moving image is selected from the moving images selected as editing targets in step S501. This processing corresponds to step S202 in the first embodiment. Assume that in this case, a moving image having a frame rate of 120 fps is selected as a reference moving image. Subsequently, in step S503, the CPU 103 determines whether the frame rate (to be referred to as "FRc_low" hereinafter) indicated by the lowest temporal layer of a conversion target moving image is equal to the frame rate (to be referred to "FRr_low" hereinafter) indicated by the lowest temporal layer of a reference moving image. If FRc_low is equal to FRr_low, the process advances to step S508. If they differ from each other, the process advances to step S504. In this case, since FRc_low is different from FRr_low, the process advances to step S504.

In step S504, the CPU 103 compares FRc_low of the conversion target moving image with FRr_low of the reference moving image. If FRc_low is lower than FRr_low, the process advances to step S505. If FRc_low is higher than FRr_low, the process advances to step S506. In the above case, the frame rate of the reference moving image is 120 fps, and FRc_low of the conversion target moving image with 60 fps is 30 fps. For this reason, the process advances to step S505. FRc_low of the conversion target moving image with 240 fps is 120 fps, and hence the process advances to step S506.

Subsequently, in step S505, the CPU 103 matches FRc_low of the conversion target moving image with FRr_low of the reference moving image by rewriting Temporal ID. This is the processing of preventing a failure to match the frame rates indicated by the respective temporal layers of moving images because of differences in Temporal ID as temporal layer specifiers at the time of subsequent combining/editing processing. In the above case, a conversion target is a moving image with 60 fps. That is, the CPU 103 converts the frame rate indicated by the lowest temporal layer to 60 fps by rewriting each picture included in the temporal layer with Temporal ID=1 to Temporal ID=0 and integrating the temporal layers with Temporal ID=0 and Temporal ID=1. The temporal layer structure reconstructed by the processing in step S505 will be described with reference to FIGS. 6A and 6B. FIG. 6A shows that each P-picture included in a temporal layer with Temporal ID=1 before rewriting is rewritten into a picture included in a temporal layer with Temporal ID=0. As a result of this rewriting operation, as shown in FIG. 6B, the frame rate indicated by the temporal layer with Temporal ID=0 becomes 60 fps.

In addition, with a change in temporal layer structure, the CPU 103 rewrites nal_unit_type (an identifier representing the type of NAL unit) included in nal_unit_header syntax and hrd_parameters (a parameter group used by a hypothetical reference decoder) included in VUI parameters syntax of the header portion of the encoded data. In this case, before the integration of the temporal layers, the CPU 103 rewrites nal_unit_type information of each picture with Temporal ID=1, which represents the image reference relationship between pictures, from TRAIL_N (nal_unit_type=2) to TRAIL_R (nal_unit_type=1). The CPU 103 then replaces HRD information corresponding to newly generated Temporal ID=0 with HRD information corresponding to Temporal ID=1 before temporal layer structure conversion.

Figure 7:
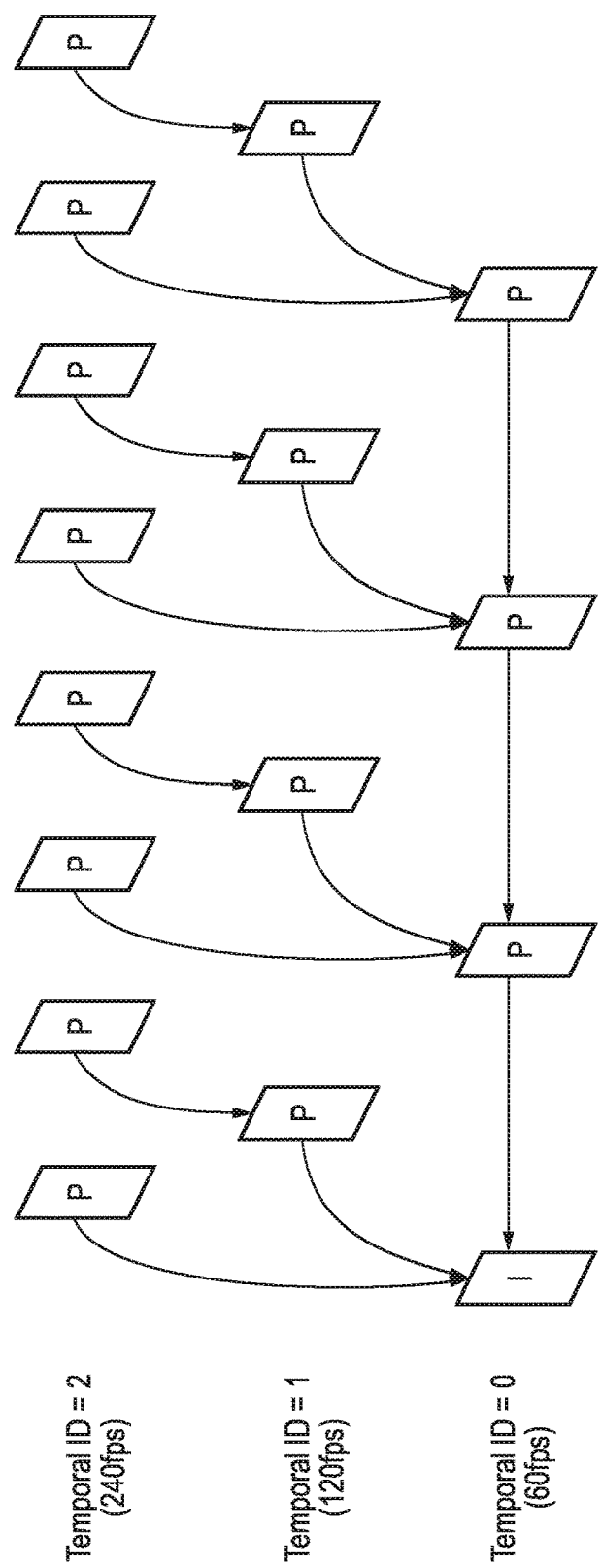
FIG. 7 is a view for explaining an example of reconstructing the temporal hierarchical structure of a moving image by reencoding according to the second embodiment of the present invention.

In step S506, the CPU 103 matches FRc_low of the conversion target moving image with FRr_low of the reference moving image by reencoding. As described with reference to step S505, this processing is to prevent a failure to match the frame rates indicated by the respective temporal layers between moving images as editing targets because of differences in Temporal ID at the time of subsequent combining/editing processing. In this case, the CPU 103 integrates FRc_low of the conversion target moving image with 240 fps with FRc_low of the reference moving image with 120 fps. More specifically, the CPU 103 converts the two temporal layer structures with 120 fps and 240 fps into three temporal layer structures with 60 fps, 120 fps, and 240 fps by reencoding. FIG. 7 shows the temporal layer structure of the conversion target moving image after reconstruction which is obtained as a result of the above processing. Referring to FIG. 7, each picture included in the temporal layer with Temporal ID=0 has a frame rate of 60 fps, and Temporal IDs corresponding to frame rates of 120 fps and 240 fps increase to Temporal ID=1 and Temporal ID=2, respectively. This sets FRc_low of the conversion target moving image with a frame rate of 240 fps to 60 fps which is equal to FRr_low of the reference moving image.

In step S507, the CPU 103 updates the frame rate information and the temporal layer information which have been changed by reconstructing the temporal layer structure of the conversion target moving image in step S505 or S506. This processing corresponds to the processing in step S207 in the first embodiment. After information stored in each header portion is updated, the process advances to step S203 in FIG. 2. The subsequent processing is the same as the processing in and after step S203 shown in FIG. 2. In step S203, the CPU 103 compares the frame rate FRc of the conversion target moving image with the frame rate FRr of the reference moving image to determine whether they are equal to each other. In the above case, since each conversion target moving image differs in frame rate from the reference moving image, the process advances to step S204.

If the CPU 103 determines as a result of comparison between FRc and FRr that the frame rate FRc of the conversion target moving image is lower in step S204, the process advances to step S205. If FRc is higher, the process advances to step S206. In this case, since the frame rate FRr of the reference moving image is set to 120 fps, the CPU 103 processes the conversion target moving image with 60 fps in step S205, and processes the conversion target moving image with 240 fps in step S206.

In step S205, the CPU 103 performs the processing of increasing the frame rate by picture interpolation using copy pictures. In this case, the CPU 103 performs the processing of converting the conversion target moving image with 60 fps into an image with 120 fps, thereby generating a temporal layer structure like that shown in FIG. 8A. Referring to FIG. 8A, a copy picture of each picture constituting a frame rate of 60 fps is generated as a P-picture, and each picture as a generation source is referred to. Temporal ID of each copy picture is 1 as a value indicating a layer immediately higher than a layer indicated by 0 which is Temporal ID of the source picture.

In step S206, the CPU 103 performs the processing of reducing the frame rate by picture discarding. In this case, the CPU 103 performs the processing of converting the conversion target moving image with 240 fps which has a plurality of temporal layer structures into a moving image with 120 fps, thereby generating a temporal layer structure like that shown in FIG. 8B. Referring to FIG. 8B, the CPU 103 discards the pictures belonging to the 240-fps temporal layer of the three temporal layers and leaves only the 60-fps temporal layer with Temporal ID=0 and the 120-fps temporal layer with Temporal ID=1. Subsequently, the CPU 103 performs the processing in steps S207 to S210 in the same manner as described in the first embodiment. Note that in this embodiment, since there are two moving images as frame conversion targets, the processing in steps S503 to S507 and steps S203 to S207 is executed twice.

According to the above description, even if the lowest temporal layers of editing target moving images differ in frame rate from each other, it is possible to prevent mismatching associated with Temporal ID at the time of combining/editing processing by reconstructing the temporal layer structure so as to match FRc_low of the conversion target moving image with FRr_low of the reference moving image. This makes it possible to generate a moving image having frame rate compatibility when combining/editing a plurality of moving images. In addition, in this embodiment, reencoding is performed only when FRc_low is higher than FRr_low, and the temporal layer structure is converted by only rewriting Temporal ID and header information when FRc_low is lower than FRr_low. This makes it possible to ensure frame rate compatibility by less reencoding.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214800, filed Oct. 30, 2015, which is hereby incorporated by reference herein in its entirety.

What is claimed is:

1. An image processing apparatus comprising:
a processor; and
a memory storing a program which, when executed by the processor, causes the image processing apparatus to:
compare a frame rate of a first moving image and a frame rate of a second moving image, wherein each moving image has temporal scalability;
convert a temporal hierarchical structure of the second moving image in accordance with the comparison result,
wherein when the frame rate of the first moving image is higher than the frame rate of the second moving image, the temporal hierarchical structure of the second moving image is converted by copying and inserting a picture included in a first temporal layer of the second moving image into a second temporal layer of the second moving image, and when the frame rate of the first moving image is lower than the frame rate of the second moving image, the temporal hierarchical structure of the second moving image is converted by discarding a picture, of pictures belonging to temporal layers of the second moving image, which belongs to a temporal layer with a frame rate higher than the frame rate of the first moving image; and
combine the first moving image with the converted second moving image.

2. An apparatus according to claim 1, wherein frame rates corresponding to highest temporal layers of the first moving image and the second moving image are compared with each other.

3. An apparatus according to claim 1, wherein a temporal layer included in the temporal hierarchical structure has a frame rate double a frame rate of an adjacent lower temporal layer.

4. An apparatus according to claim 1, wherein the second temporal layer is a temporal layer higher than the first temporal layer.

5. An apparatus according to claim 1, wherein a picture to be discarded belongs to a temporal layer which the first moving image does not have.

6. An apparatus according to claim 1, wherein the temporal hierarchical structure of the second moving image is converted when, between the first moving image and the second moving image, the numbers of temporal layers differ from each other or frame rates associated with the respective temporal layers differ from each other.

7. An apparatus according to claim 1, wherein executing the program by the processor further causes the image processing apparatus to:
acquire image data by capturing an image of an object; and
generate the moving image by encoding the image data to have temporal scalability.

8. An image processing method, comprising:
comparing a frame rate of a first moving image and a frame rate of a second moving image, wherein each moving image has temporal scalability;
converting a temporal hierarchical structure of the second moving image in accordance with the comparison result,
wherein when the frame rate of the first moving image is higher than the frame rate of the second moving image, the temporal hierarchical structure of the second moving image is converted by copying and inserting a picture included in a first temporal layer of the second moving image into a second temporal layer of the second moving image, and when the frame rate of the first moving image is lower than the frame rate of the second moving image, the temporal hierarchical structure of the second moving image is converted by discarding a picture, of pictures belonging to temporal layers of the second moving image, which belongs to a temporal layer with a frame rate higher than the frame rate of the first moving image; and
combining the first moving image with the converted second moving image.

9. A non-transitory computer-readable storage medium storing a program that, when executed by a processor, causes the processor to perform operations comprising:
comparing a frame rate of a first moving image and a frame rate of a second moving image, wherein each moving image has temporal scalability;
converting a temporal hierarchical structure of the second moving image in accordance with the comparison result,
wherein when the frame rate of the first moving image is higher than the frame rate of the second moving image, the temporal hierarchical structure of the second moving image is converted by copying and inserting a picture included in a first temporal layer of the second moving image into a second temporal layer of the second moving image, and when the frame rate of the first moving image is lower than the frame rate of the second moving image, the temporal hierarchical structure of the second moving image is converted by discarding a picture, of pictures belonging to temporal layers of the second moving image, which belongs to a temporal layer with a frame rate higher than the frame rate of the first moving image; and
combining the first moving image with the converted second moving image.

* * * * *